US008070463B2

(12) United States Patent
Stephens et al.

(10) Patent No.: US 8,070,463 B2
(45) Date of Patent: Dec. 6, 2011

(54) ROTARY RECIPROCATING INTENSIFIED HYDRAULIC ACTUATOR

(76) Inventors: Gregory A. Stephens, Russiaville, IN (US); Alan Claxton, Walton, IN (US); David Claxton, Logansport, IN (US); Thomas Thompson, Logansport, IN (US)

( * ) Notice: Subject to any disclaimer, the term of this patent is extended or adjusted under 35 U.S.C. 154(b) by 354 days.

(21) Appl. No.: 12/583,152

(22) Filed: Aug. 14, 2009

(65) Prior Publication Data

US 2009/0304533 A1    Dec. 10, 2009

Related U.S. Application Data

(63) Continuation-in-part of application No. 11/591,824, filed on Nov. 2, 2006, now abandoned.

(51) Int. Cl.
*F04B 35/00* (2006.01)
*F04B 47/08* (2006.01)
(52) U.S. Cl. ........................ 417/379; 417/375
(58) Field of Classification Search .................. 417/375, 417/379, 360, 397; 279/4.01, 4.04; 82/147
See application file for complete search history.

(56) References Cited

U.S. PATENT DOCUMENTS

| | | | | |
|---|---|---|---|---|
| 2,886,007 A * | 5/1959 | Manchester | ............... | 92/116 |
| 3,364,823 A * | 1/1968 | Milton et al. | ............... | 91/420 |
| 3,690,687 A * | 9/1972 | Moe | ............... | 279/4.04 |
| 3,739,974 A * | 6/1973 | Kiwalle et al. | ............... | 228/2.3 |
| 4,080,716 A * | 3/1978 | vom Dorp | ............... | 29/559 |
| 4,422,654 A * | 12/1983 | Grunig | ............... | 279/4.01 |
| 4,598,617 A * | 7/1986 | Kubo et al. | ............... | 82/158 |
| 4,652,189 A * | 3/1987 | Mizoguchi | ............... | 409/136 |
| 4,669,362 A * | 6/1987 | Nobukawa et al. | ............... | 91/467 |
| 4,742,740 A * | 5/1988 | Hasslauer et al. | ............... | 82/127 |
| 4,795,293 A * | 1/1989 | Mizoguchi | ............... | 409/136 |
| 5,125,234 A * | 6/1992 | Yonezawa et al. | ............... | 60/563 |
| 5,549,427 A * | 8/1996 | Hiestand | ............... | 409/233 |
| 5,613,812 A * | 3/1997 | Levan et al. | ............... | 409/136 |
| 5,746,436 A * | 5/1998 | Kulan et al. | ............... | 279/4.04 |
| 5,797,605 A * | 8/1998 | Gross et al. | ............... | 279/4.05 |
| 5,836,161 A | 11/1998 | Malina | | |
| 6,038,948 A * | 3/2000 | Link et al. | ............... | 82/147 |
| 6,311,987 B1 * | 11/2001 | Rinne et al. | ............... | 279/4.03 |
| 6,478,310 B1 * | 11/2002 | Azami | ............... | 279/4.02 |
| 6,544,102 B2 * | 4/2003 | Schafer et al. | ............... | 451/5 |
| 6,581,509 B1 * | 6/2003 | Clark et al. | ............... | 92/106 |
| 6,644,637 B1 * | 11/2003 | Shen et al. | ............... | 269/152 |
| 6,705,082 B2 | 3/2004 | Ju | | |
| 6,758,467 B2 | 7/2004 | Kitaura | | |
| 2004/0051256 A1 * | 3/2004 | Ayrton | ............... | 279/4.01 |
| 2004/0080087 A1 * | 4/2004 | Lin et al. | ............... | 269/32 |
| 2005/0044686 A1 * | 3/2005 | Huijbers et al. | ............... | 29/428 |
| 2005/0150373 A1 * | 7/2005 | Clark et al. | ............... | 92/86 |
| 2005/0184472 A1 * | 8/2005 | Huijbers et al. | ............... | 279/4.01 |

\* cited by examiner

*Primary Examiner* — Devon C Kramer
*Assistant Examiner* — Alexander Comley
(74) *Attorney, Agent, or Firm* — Frank Lachenmaier

(57) ABSTRACT

This invention relates generally to a pneumatic, hydraulic or other media driver, rotating-reciprocating cylinder apparatus to be mounted on the proximal end of CNC lathe spindles, vertical or inverted machining centers, hydraulic machining work cells or rotary transfer machines to actuate work holding chucks, work holding fixtures, clamping apparatus or work supports on the distal end of said spindles. More specifically, this invention relates to an actuating system with the capability of boosting the input hydraulic pressure to the holding device by a pre-set multiple up to 5000 psi where the boost pump is integral to and rotates with the clamp cylinder assembly.

2 Claims, 5 Drawing Sheets

ROTARY RECIPROCATING INTENSIFIED HYDRAULIC ACTUATOR

CROSS REFERENCE TO RELATED APPLICATIONS

This application is a Continuation-in-part of parent application Ser. No. 11/591,824 which is hereby abandoned.

BACKGROUND

1. Field of Invention

This invention relates generally to a pneumatic, hydraulic or other media driver, rotating-reciprocating cylinder apparatus to be mounted on the proximal end of CNC lathe spindles, vertical or inverted machining centers, hydraulic machining work cells or rotary transfer machines to actuate work holding chucks, work holding fixtures, clamping apparatus or work supports on the distal end of said spindles. More specifically, this invention relates to an actuating system with the capability of boosting the input hydraulic pressure to the holding device by a pre-set multiple up to 5000 psi where the boost pump is integral to and rotates with the clamp cylinder assembly.

2. Prior Art

A variety of high speed rotating cylinders exist and are used on many different machine tools to activate clamps that turn with the work piece. To achieve high speed operation many complex and costly systems have been produced. It is often the case that sufficient hydraulic pressure to clamp the work piece with sufficient force to withstand these high rotary speeds is not available within the existing system. There are commercially available stationary hydraulic booster systems that work with an internal oscillating pump which boosts inlet pressures by pre-set multiples but until this invention there was not an efficient apparatus for incorporating such a system to rotate with a rotary reciprocating cylinder. Prior art systems include a fixed position booster which boosts the pressure before the rotary connection between the boost pump and the rotating clamp cylinder and spindle creating high pressure connections that are rotary and high speed making the hydraulic fluid seals at the rotary interface very difficult and expensive.

SUMMARY an objective of the present invention is to provide an apparatus capable of adapting a commercially available hydraulic pressure intensifier, such as the PID Series oil-to-oil intensifier from Enerpac, located at 6101 N. Baker Rd, Milwaukee, Wis. 53209, to fit into and rotate with a reciprocating, rotating hydraulic cylinder capable of high speeds (7000 rpms); to increase output pressure (up to 5000 psi) to a holder that rotates with the work piece; to dampen vibration by adding to the flywheel mass of rotating cylinder assembly; and to provide the rotary interface connections between the fixed non-rotating housing at before boost (low) pressures and to provide solid direct non-rotating joints for all hydraulic fluid connections after boost (high) pressures minimizing hydraulic fluid leaks and seal failures thus reducing machine down time and repair costs, satisfying the required application.

Another objective is to provide an apparatus capable of adapting a commercially available hydraulic intensifier to fit into and rotate with a reciprocating, rotating hydraulic cylinder capable of high speeds and high clamping pressures that embodies a pneumatic work piece present sensor.

Another objective is to provide an apparatus capable of adapting a commercially available hydraulic intensifier to fit into and rotate with a reciprocating, rotating hydraulic cylinder capable of high speeds and high clamping pressures that provides an extra port and piping system that allows the introduction of light viscosity fluid to be introduced to the work piece for cooling or lubrication or activation of another hydraulic or pneumatic device.

Another objective is to provide an apparatus capable of adapting a commercially available hydraulic intensifier to fit into and rotate with a reciprocating, rotating hydraulic cylinder capable of high speeds and high clamping pressures that is self contained as an integral part of the clamp cylinder mechanism with no separate add-on parts required such as a stationary booster that adds hanging weight to the system causing imbalance and excess stress on spindle bearings.

These objectives are met by the design as shown and described in the accompanying drawings and specification.

DRAWINGS

In order that the invention may be more fully understood it will now be described by way of example, with reference to the accompanying drawings in which.

REFERENCE NUMERALS

The same reference numbers are used to refer to the same or similar parts in the various views.

Description in order that Rotary Reciprocating Intensified Hydraulic Actuator 10 may be more fully understood, it will now be described by way of example with reference to the accompanying drawings.

Figure 1:
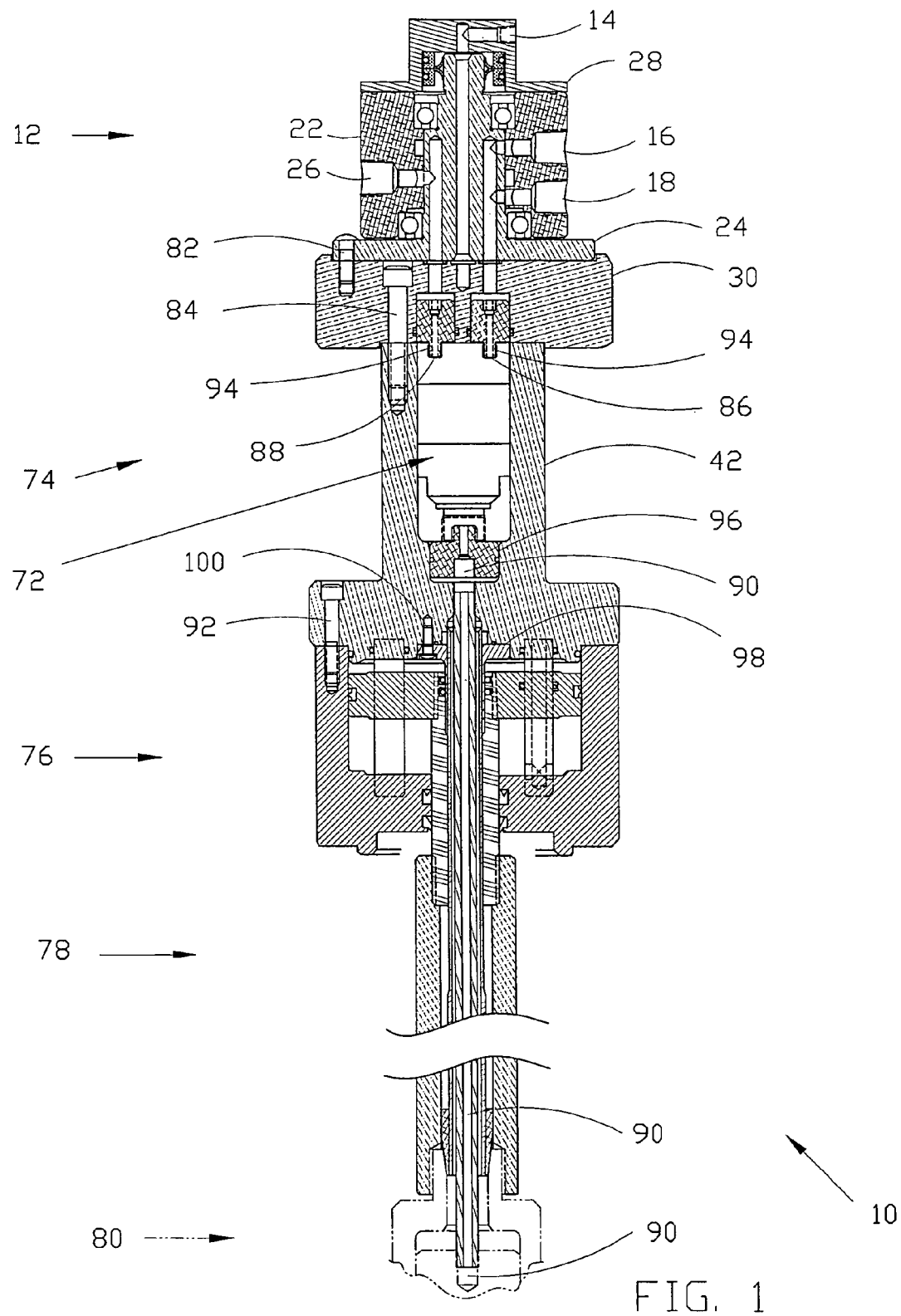
FIG. 1 is a cross-section view of a Rotary Reciprocating Intensified Hydraulic Actuator featuring the hydraulic connections to and through the intensifier to the chuck assembly.

FIG. 1 illustrates the five major assemblies that combine to provide the aforementioned benefits. These are intensifier assembly 72, intensifier adapter assembly 74, oil supply distributor assembly 12, clamp cylinder assembly 76 and spindle assembly 78. Intensifier assembly 72 fits inside intensifier adapter assembly 74 and rotates with it. Non-rotating housing 22 of Oil supply distributor assembly 12 is fixed with inlet and outlet hydraulic fluid ports 16, 18 and 26 and is rotationally connected through internally rotating spindle 24 that is solidly mounted to the proximal end of intensifier adapter assembly 74. Clamp cylinder assembly 76 is solidly mounted to the distal end of intensifier adapter assembly 74. Spindle assembly 78 is solidly mounted to the distal end of clamp cylinder assembly 76.

FIG. 1 is a section view disclosing the connections between oil supply distributor assembly 12 and intensifier adapter assembly 74 which contains intensifier assembly 72, clamp cylinder assembly 76, spindle assembly 78, and in phantom lines a partial view of chuck or work holder assembly 80 that is not claimed as part of this invention. This section view features the hydraulic feeds and returns into intensifier assembly 72 at pre-boost (low) pressure and the high pressure output 90 that is transferred through the clamp cylinder 76 and spindle assembly 78 to the proximal surface of some form of chuck or work holder assembly 80 to supply sufficient clamping or holding forces to withstand the forces from high speed rotation of the work piece.

FIG. 2 again illustrates the five major assemblies, but in this view the featured connections are shown between the oil supply distributor assembly 12 and clamp cylinder assembly 76. When the clamp cylinder is extended it moves the spindle assembly 78 forward and when retracted moves spindle assembly 78 in reverse, activating a clamping and unclamping chuck or work holder assembly 80 that rotates with the work piece and is not part of this invention.

FIG. 3 illustrates again the five major subassemblies, but in this view the featured connections are shown between oil supply distributor assembly 12's air inlet port 14, through intensifier adapter assembly 74 and through spindle assembly 78, providing another controllable fluid at the distal end of spindle assembly 78 which can be utilized for a parts present sensor, lubricant, cooling fluid or any other hydraulic or pneumatic article activation.

FIGS. 4, 4A, 4B, 4C and 5 disclose the design of intensifier adapter end cap 30.

Figure 4:
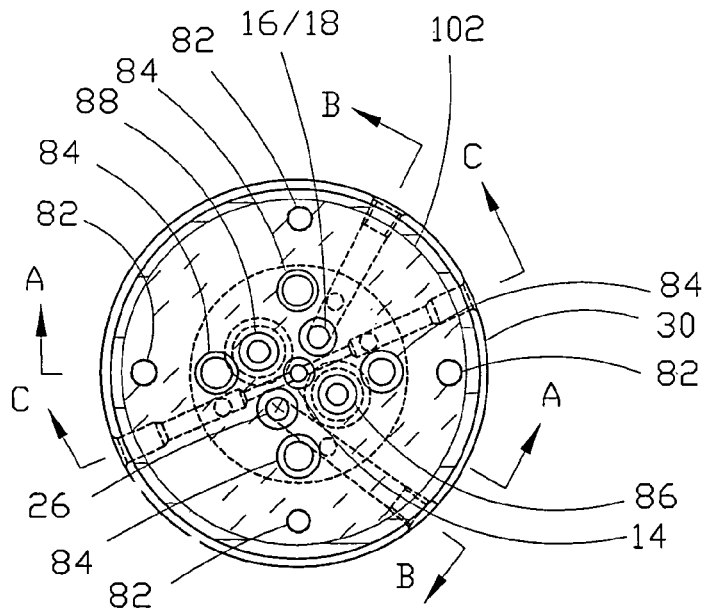
FIG. 4 is a top view of the intensifier adapter end cap.

FIG. 4 is a top view showing proximal shallow bore 102 into the proximal surface of cap 30 that is facilitated to receive inner rotating spindle 24 from oil distributor assembly 12. Radially spaced towards the outer perimeter of bore 102 are four evenly spaced tapped holes 82 for fastening cap 30 securely to inner rotating spindle 24. Radially inboard are 4 evenly spaced counter bored through bolt holes 84 that are used for fastening cap 30 to proximal surface of intensifier adapter housing 42.

Figure 4A:
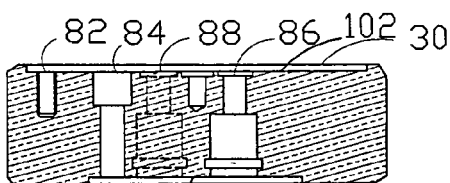
FIG. 4A is a section view of the intensifier adapter end cap showing the mounting screws and the intensifier hydraulic feed connections.

FIG. 4A is a section view through a mounting screw and bolt hole described above and also through the clearance holes for intensifier adapter base fittings 94 and hydraulic return-intensifier pilot 86 and hydraulic feed-intensifier 88 as shown in FIG. 1.

Figure 2:
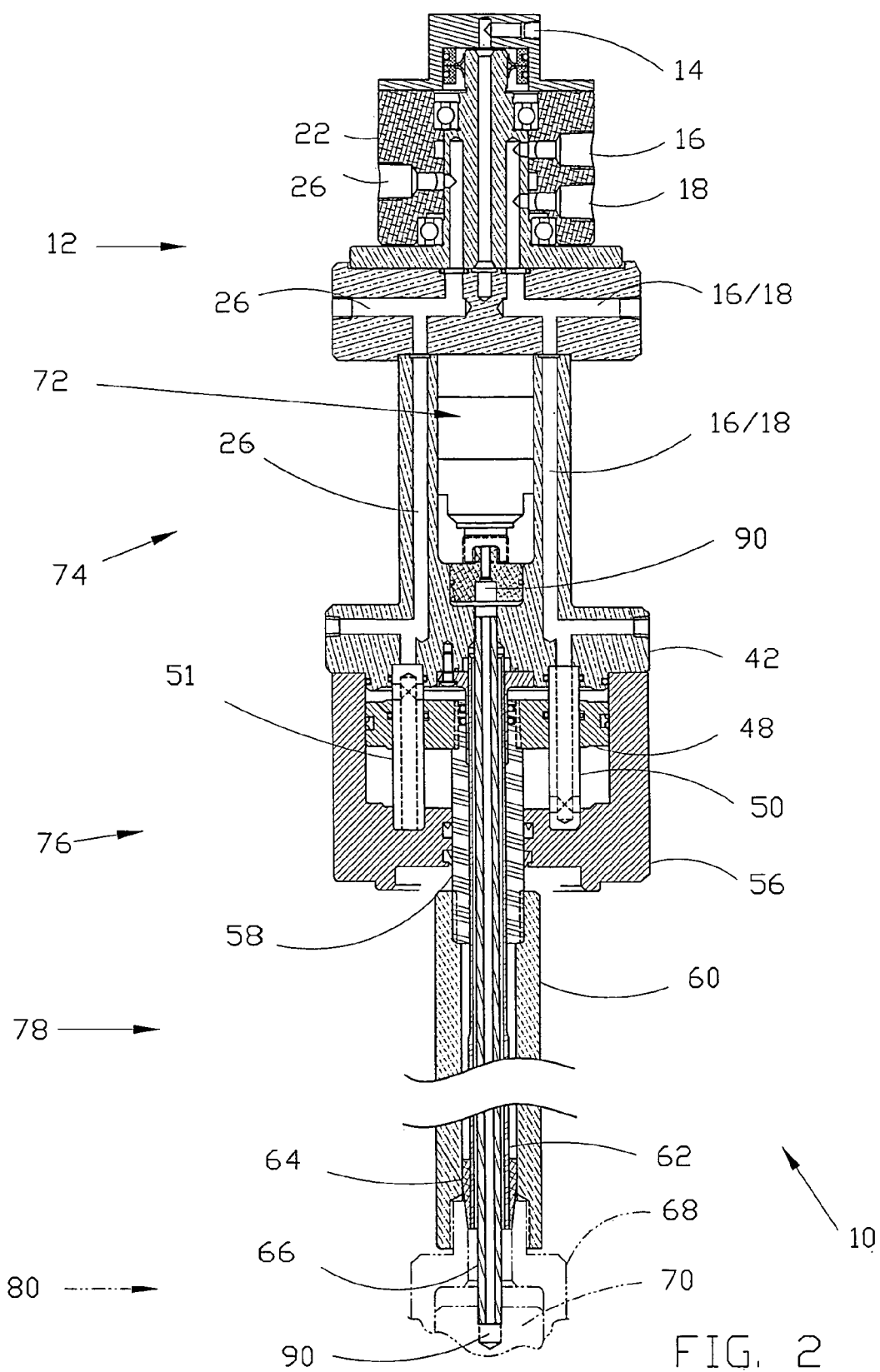
FIG. 2 is a cross-section view of a Rotary Reciprocating Intensified Hydraulic Actuator featuring the hydraulic connections to and from the clamp cylinder.
Figure 4B:
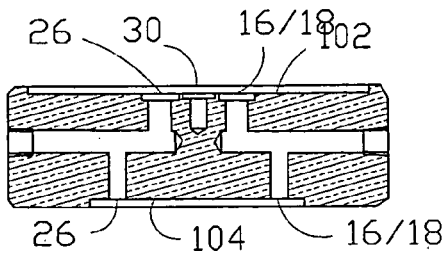
FIG. 4B is a section view of the intensifier adapter end cap showing the clamp cylinder hydraulic feed connections.

FIG. 4B is a stepped section view that discloses the counter bored holes 16/18 and 26 for hydraulic fluid flow to and from clamp cylinder assembly 76 with cross drilled holes from the perimeter towards the center, plugged on the outside and output holes drilled from the surface of distal shallow bore 104, expanded outward from the top entrance holes as shown in FIG. 2.

Figure 3:
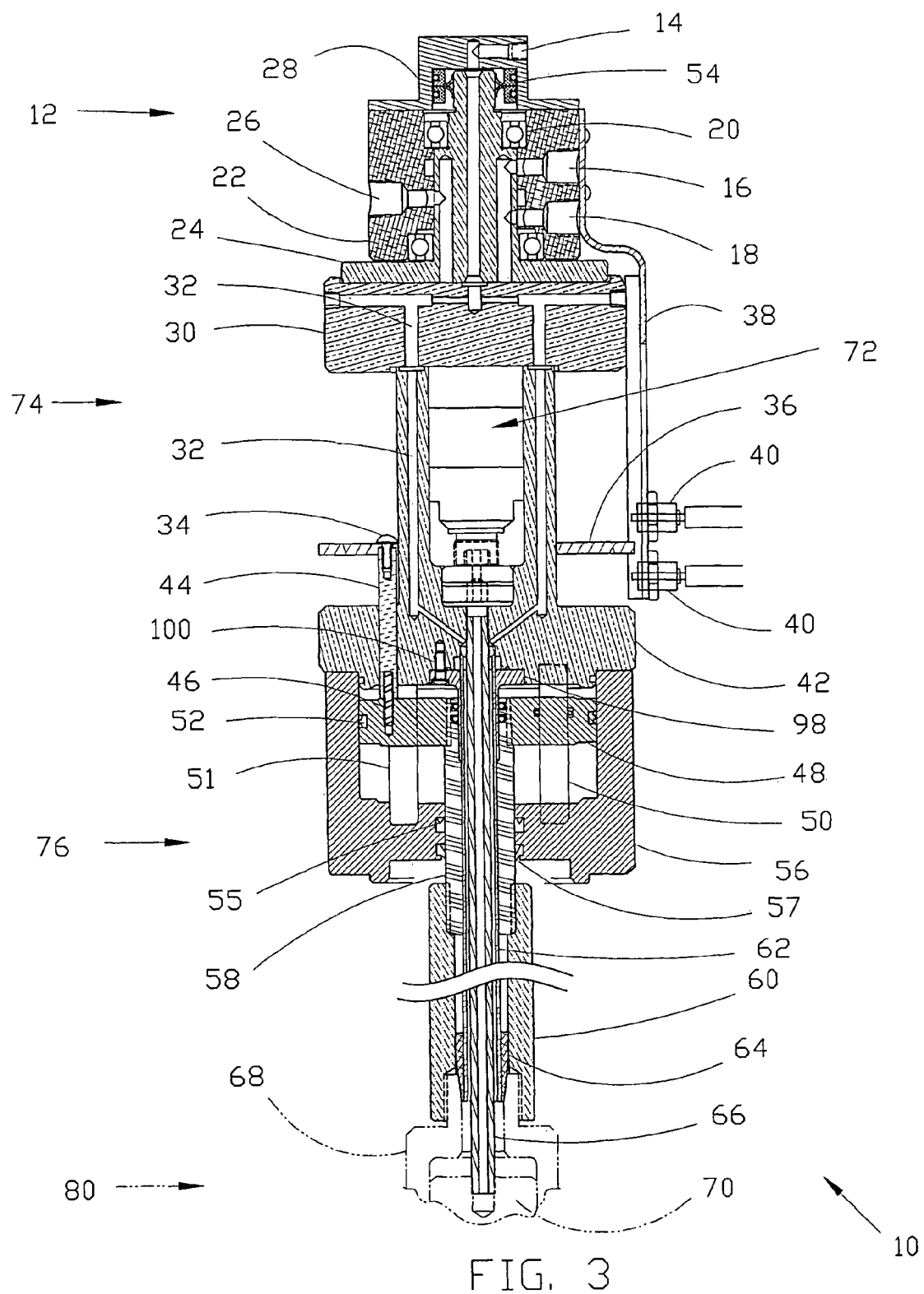
FIG. 3 is a cross-section view of a Rotary Reciprocating Intensified Hydraulic Actuator showing the pneumatic connections to the chuck assembly and the proximity sensor piston stroke control mechanism.
Figure 4C:
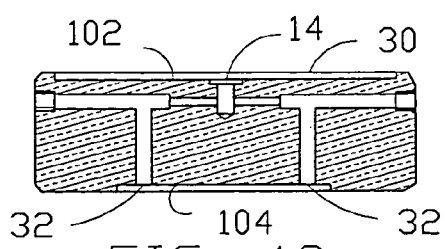
FIG. 4C is a section view of the intensifier end cap showing the chuck assembly pneumatic connections.

FIG. 4C shows center bore 14 which is the input channel for the air feed or other low viscosity fluid that will be passed on to chuck or work holder assembly 80. This center bore is penetrated by two cross drilled holes plugged on the outside and penetrated from the distal surface expanded toward the perimeter output holes as shown in FIG. 3.

Figure 5:
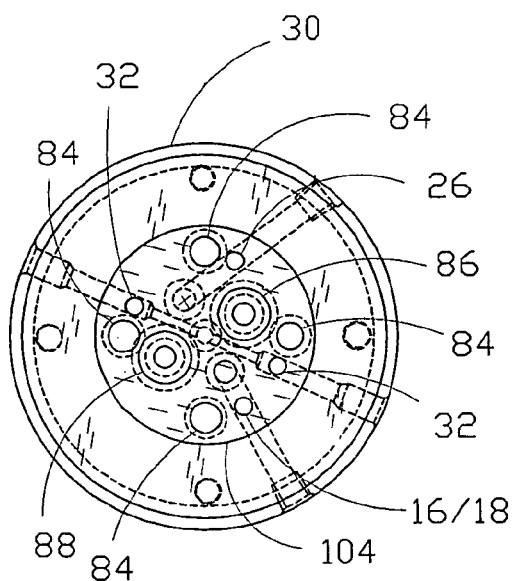
FIG. 5 is a bottom view of the intensifier adapter end cap.

FIG. 5 is a bottom view of cap 30 that shows distal shallow bore 104 which is facilitated to receive the proximal surface of intensifier adapter housing 42.

Figure 6:
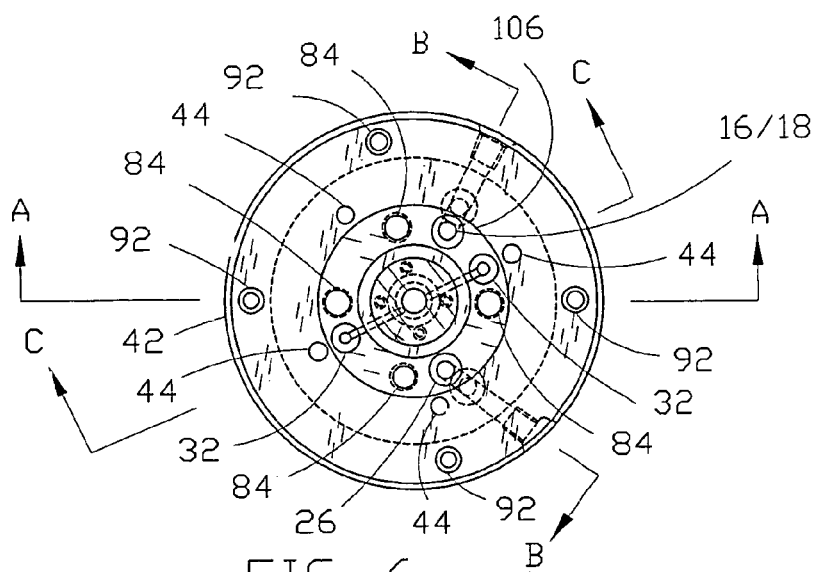
FIG. 6 is a top view of the intensifier adapter housing.

FIG. 6 is a top view of intensifier adapter housing 42.

Figure 6A:
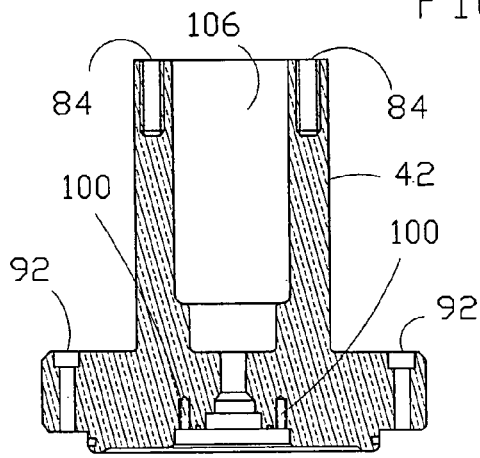
FIG. 6A is a section view of the intensifier adapter housing showing the mounting screws and the intensifier hydraulic feed connections.
Figure 6B:
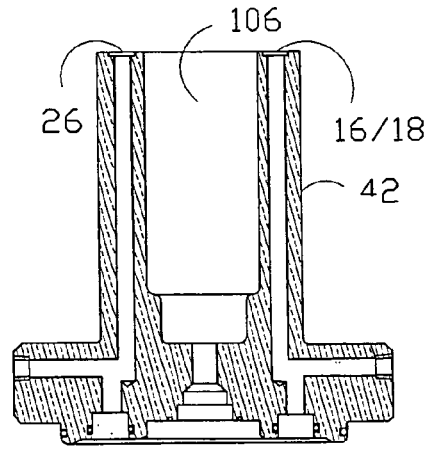
FIG. 6B is a section view of the intensifier adapter housing showing the clamp cylinder hydraulic feed connections.

FIG. 6A is a section view through the center showing tapped mounting holes 84 for connecting bolts between end cap 30 and housing 42. It also shows counter bored bolt holes for mounting housing 42 to clamp cylinder housing 56. This view illustrates pocket 106 which is facilitated to receive commercially available intensifier assembly 72. The distal end of pocket 106 is where intensifier adapter top fitting 96 is sealed and is screwed into the top of intensifier assembly 72 as shown in FIG. 1. FIG. 6A also shows tapped mounting screw holes 100 for steel tube sleeve 98 also shown in FIG. 1.

FIG. 6 B shows the hydraulic fluid channels 26 and 16/18 and their entrance into sealed wells for the piston guide posts and hydraulic feeds 50 and 51 as shown in FIG. 2.

Figure 6C:
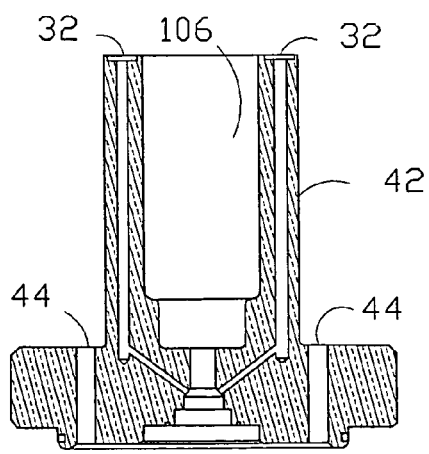
FIG. 6C is a section view of the intensifier adapter housing showing the chuck assembly pneumatic connections.

FIG. 6C shows the air or other fluid lines 32 coming down both sides of pocket 106, angling into the tapered surface leading out of the threaded opening for steel tube 66 as shown in FIG. 3

Figure 7:
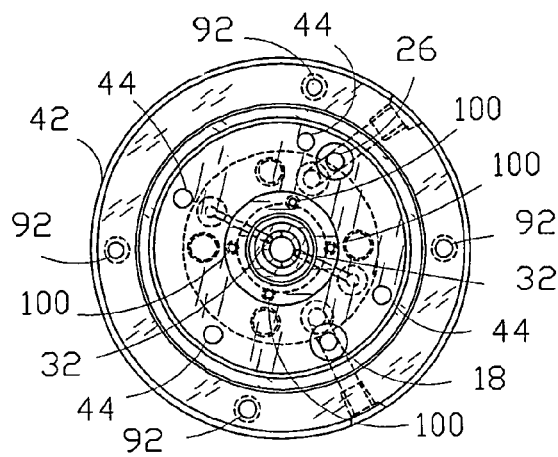
FIG. 7 is a bottom view of the intensifier adapter housing.

FIG. 7 is a bottom view of housing 42.

Operation

Rotary reciprocating Intensified Actuator 10 is to be mounted on the back end of a CNC lathe or a vertical or inverted machining center and actuates chuck or work holder assembly 80 on the opposite end of spindle 58. Hydraulic connection to chuck or work holder assembly 80 is through rotating concentric steel tubes 66 and 62. Mechanical connection to chuck or work holder assembly 80 is through concentric rotating and reciprocating spindle 58 and spindle draw bar 60.

The functions of Actuator 10 are to stroke piston 48 internal to clamp cylinder assembly 76 that is connected through spindle 58 to spindle draw bar 60 that is connected to chuck or work holder assembly 80, thereby moving chuck jaws to clamp or unclamp a work piece. Actuator 10 uses a commercially available, internally mounted hydraulic pressure intensifier assembly 72 that rotates with the clamp cylinder to supply a predetermined hydraulic pressure boost to chuck or work holder assembly 80 via steel connecting tube 66. One of the most significant advantages of Actuator 10 over fixed position boosters is that in Actuator 10 the interface between non-rotating housing 22 and internally rotating spindle 24 is accomplished at relatively low pressure whereas all of the connections after the intensifier at high pressure rotate with the intensifier and are solidly connected (without rotational seals) thus reducing the likelihood of hydraulic fluid leaks and equipment downtime. Fixed position boosters typically require very expensive and difficult to maintain connections to the cylinders rotating at high speeds with boosted pressures. Actuator 10 also supplies air to chuck or work holder assembly 80 or another low viscosity fluid for the purpose of sensing work piece presence, lubricating, cooling or any other hydraulic or pneumatically driven operation via the gap between outside diameter of tube 66 and the inside diameter of tube 62.

Actuator 10 is comprised of oil supply distributor assembly 12 which is facilitated for connection of all supply and drain hoses to actuator 10. Distributor assembly 12 has an outer non-rotating housing 22 with porting for hose connections 14, 16, 18 and 26 and is supported by bearings 20 on inner rotating spindle 24. The resulting capillary type seal provides separation between the ports and also allows for oil flow through the bearings. This oil flow necessitates the drain port returning this flowing oil back to tank. A hydraulic supply hose is connected to cylinder retract port 16 for cylinder retraction stroke. A hydraulic supply hose is connected to cylinder extend port 26 for cylinder extension stroke. The hydraulic supply hose connected to port 26 also supplies intensifier pressure-middle port 88 for feeding hydraulic fluid into intensifier assembly 72 through intensifier adapter base fitting 94. Commercially available intensifiers use an internal oscillating pump to boost the hydraulic pressure at outlet to predetermined multiples of inlet pressure as intensified outlet pressures 90 to chuck or work holder assembly 80 at the distal end of spindle assembly 78.

Control of the hydraulic oil supply to the distributor is accomplished with commercially available, external valves controlled at the machine control panel. The valves used are two conventional four-way 2 position crossover valves. The first is for cylinder stroke shifting and the second is for intensifier supply and relief.

The logic sequence for these valves is as follows:

Set Machine control to "Chuck Clamp." Cylinder retract and intensifier supply are activated simultaneously. This simultaneous two valve shift allows the cylinder extend and intensifier pilot to depressurize for free flow back to tank. The pilot pushes open a check valve in the intensifier that releases the intensified pressure.

Set machine control to "Chuck Unclamp." Cylinder extend and intensifier return to rest positions. This simultaneous two valve shift allows the cylinder retract and intensifier to depressurize for free oil flow back to tank.

Control of piston 48 is accomplished with adjustable proximity sensors 40 that are mounted on bracket for proximity sensors 38 that are mounted to distributor Assembly 12. Proximity target 36 is mounted around the small diameter of housing 42 with screws for proximity target connector shaft 34 into tapped holes in proximity target connector shafts 44 that slide in clearance holes in base of housing 42 and are mounted to threaded studs 46 that are screwed into the back side of piston 48.

Intensified hydraulic pressure 90 and a separate fluid flow 32 are supplied to chuck or work holder assembly 80 at the distal end of Actuator 10 by concentric steel tubes that are part of spindle assembly 78. The inside and heaviest tube is the hi-pressure steel tube 66 with its proximal end threaded into the backside small diameter opening in the center of housing 42 and the distal end protruding into the back of chuck or work holder assembly 80, facilitating the delivery of hydraulic fluid under hi-pressure 90 against the back side of a movable clamp 70. A small air gap is created by the slightly larger inside diameter of steel tube 62 which runs concentrically with tube 66 from the angled well in the back of housing 42 to the end of the wedge clamp 64 as it enters chuck or work holder assembly 80. Steel tube 66 is concentrically entrapped by steel tube sleeve 98 at its proximal end and wedge clamp 64 at its distal end. Steel tube sleeve 98 is fastened to the back of housing 42 with screws 100 and has o-ring seals between it and spindle 58 and does not reciprocate with piston 48. Spindle 58 is threaded into piston 48 and reciprocates with it. Spindle draw bar 60 is threaded over the distal end of spindle 58.

The preceding descriptions are for illustrative purposes and are not intended to limit the scope of this invention. The scope of the invention should be determined by the appended claims rather than by the specific examples given.

The invention claimed is:

1. A rotary reciprocating intensified hydraulic actuator, comprising an intensifier assembly with an axis of rotation comprising an internal oscillating-type hydraulic pressure intensifier with a proximal surface, a distal surface, a hydraulic feed port and a hydraulic return port in said proximal surface, an outlet port in said distal surface, and an internal oscillating pump that is facilitated to provide predetermined hydraulic pressure boost levels, two intensifier adapter base fittings screwed into said hydraulic feed port and said hydraulic return port on said proximal surface, and an intensifier adapter top fitting screwed into said outlet port in said distal surface; contained within and rotating with an intensifier adaptor assembly comprising: an intensifier adaptor end cap with a proximal surface, a distal surface, through channels for hydraulic and pneumatic feeds and two counter bored clearance holes for said intensifier adaptor base fittings with o-ring seals to said distal surface, fastened to the proximal surface of an intensifier adaptor housing with a proximal surface, a distal surface, a flange diameter, through channels for hydraulic and pneumatic feeds, a concentric pocket depending axially from said proximal surface, facilitated for insertion of said intensifier assembly, a clearance hole at the distal end of said concentric pocket for said intensifier adapter top fitting with o-ring seals, a small diameter through hole threaded at the distal end for a hi-pressure steel tube, two clearance holes in said distal surface for piston guide posts and hydraulic feeds, four clearance holes in said flange diameter for proximity sensor connector shafts, said two piston guide posts and hydraulic feeds mounted into said clearance holes with o-ring seals, and a steel tube sleeve concentrically mounted to the distal surface of said intensifier adaptor housing; where said proximal surface of said end cap is securely attached to distal surface of an inner rotating spindle of an oil supply distributor assembly comprising: said inner rotating spindle riding on bearings within, an outer non-rotating housing with a retract cylinder oil supply port, a retract cylinder and hydraulic pressure intensifier drain to tank port and a extend cylinder and hydraulic pressure intensifier oil supply port, fastened to a distributor end cap with a pneumatic or low viscosity fluid port; a clamp cylinder assembly securely attached to said distal surface of said intensifier adaptor assembly comprising: a cylinder housing with a proximal surface, a distal surface, an inside diameter, an inside surface, an outside diameter, two clearance holes in said inside surface for piston guide posts and hydraulic feeds, a clamp cylinder piston with a proximal surface and a distal surface with a seal to said inside diameter of said cylinder housing, two clearance through holes for said piston guide posts and hydraulic feeds with o-ring seals, four proximity connector studs mounted to said proximal surface of said piston, with said four proximity sensor connector shafts threaded onto said four connector studs, which are attached to proximity target, whose perimeter is adjacent to and in-between two proximity sensors, that are adjustably mounted to a proximity sensor bracket, that is mounted to said outer non-rotating distributor housing; a spindle assembly with a proximal end and a distal end comprising: said hi-pressure steel tube with a proximal end, a distal end, an inside diameter and an outside diameter that is threaded on said outside diameter of said proximal end and screwed into said small diameter in said distal surface of intensifier adaptor housing, a concentrically mounted steel tube that runs within said steel tube sleeve at the proximal end and encased in a clamp seal threaded into spindle draw bar at the distal end, said inner rotating spindle is threaded into said back surface of said piston with o-ring seals to said steel tube sleeve, said spindle draw bar is threaded onto said inner rotating spindle, wherein the motion of said piston articulates a chuck or work holder assembly and hi-pressure fluid is available at the distal end of said steel tube for additional clamping pressures and a secondary low viscosity fluid is available at the distal end of said spindle assembly.

2. A Rotary Reciprocating Intensified Hydraulic Actuator, according to claim 1 wherein a secondary low viscosity fluid is available at the distal end said spindle assembly for a use selected from the following group of actions: air for a pneumatic part-present sensor, cooling fluid for a cutting operation, light weight oil for lubrication of rotary fixturing, air for pneumatic control of additional articulation of part or fixture, or hydraulic fluid for secondary clamp operation.

* * * * *